Jan. 22, 1935.  N. C. CHRISTENSEN  1,988,541
METHOD AND APPARATUS FOR TREATING SOLIDS WITH GASEOUS MEDIA
Filed May 20, 1930   2 Sheets-Sheet 1
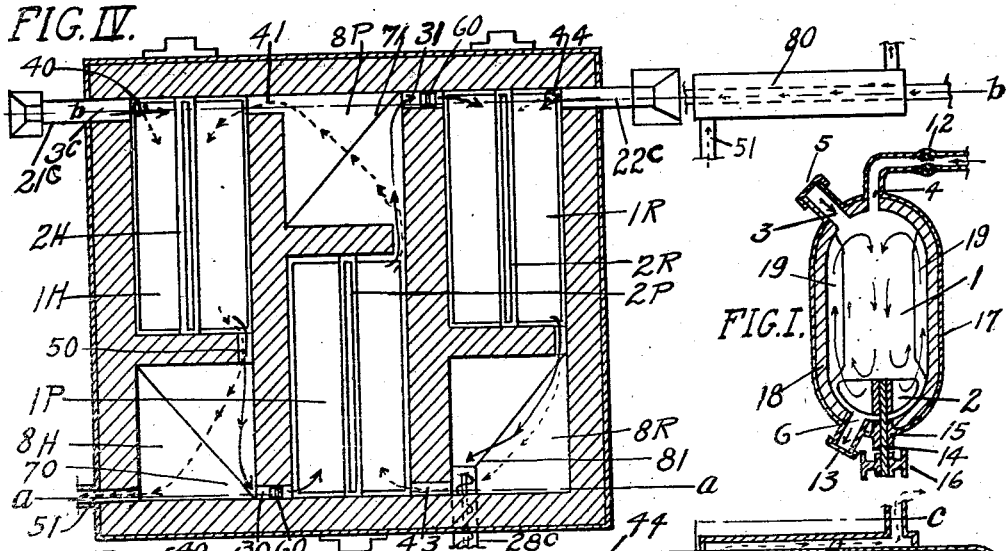
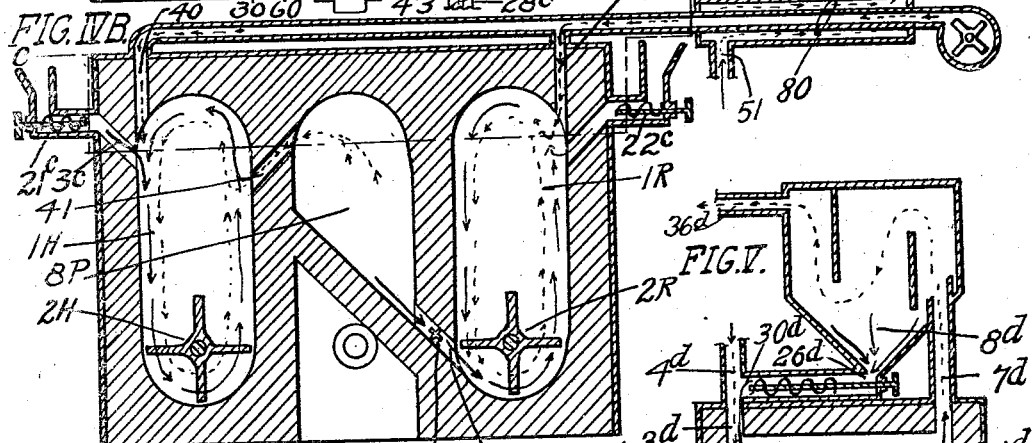
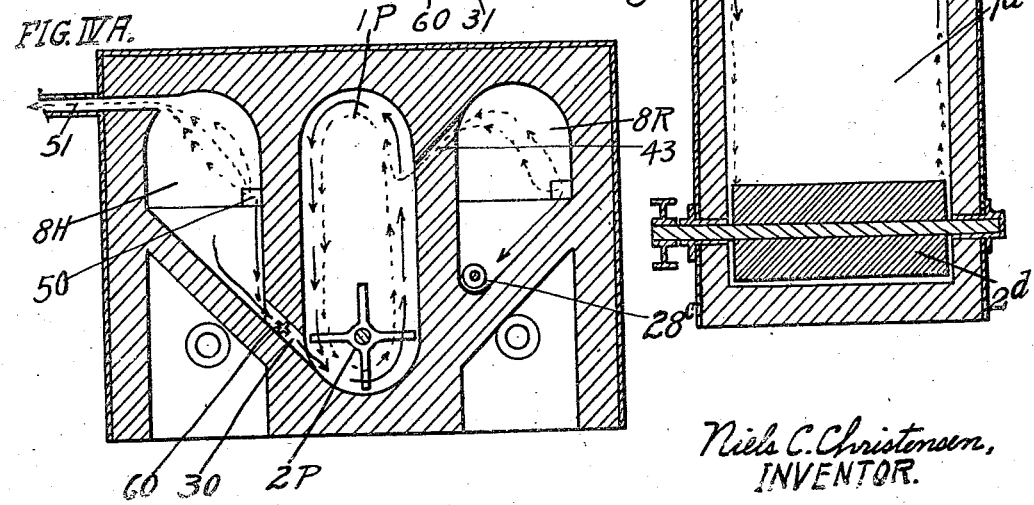
Niels C. Christensen,
INVENTOR.

Jan. 22, 1935. N. C. CHRISTENSEN 1,988,541
METHOD AND APPARATUS FOR TREATING SOLIDS WITH GASEOUS MEDIA
Filed May 20, 1930 2 Sheets-Sheet 2
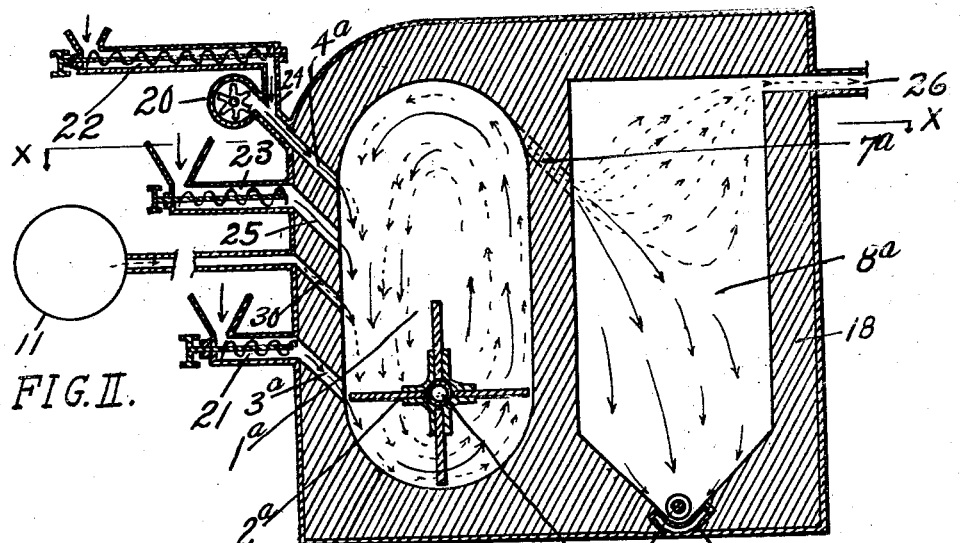
FIG. II.
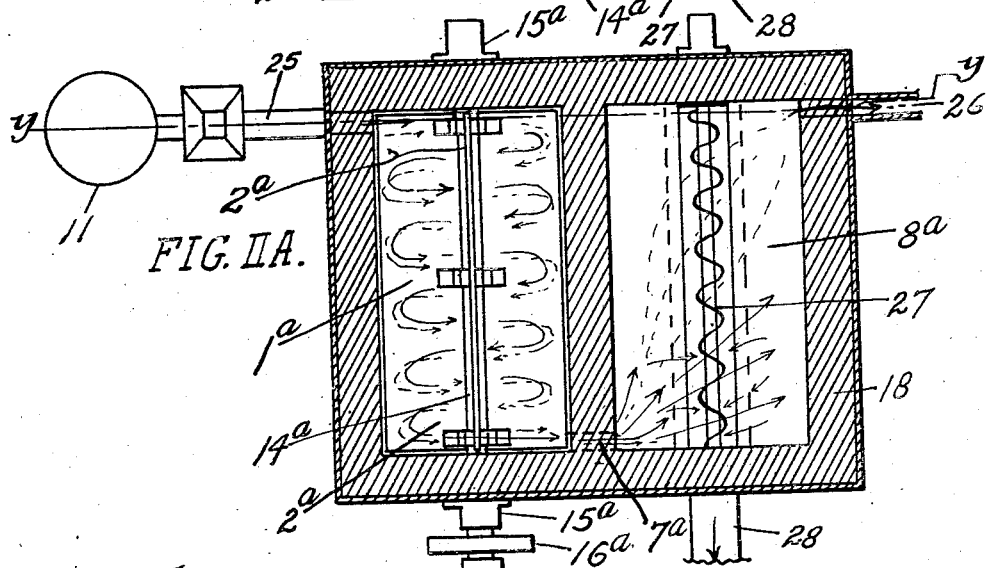
FIG. IIA.
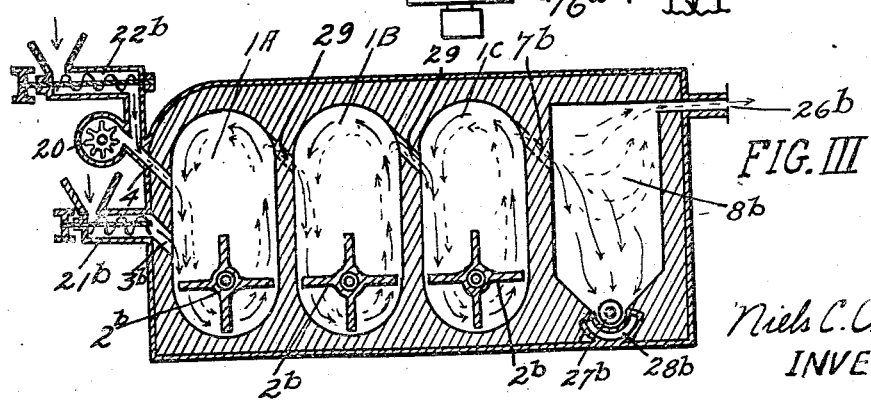
FIG. III
Niels C. Christensen
INVENTOR.

Patented Jan. 22, 1935

1,988,541

UNITED STATES PATENT OFFICE 1,988,541

METHOD AND APPARATUS FOR TREATING SOLIDS WITH GASEOUS MEDIA

Niels C. Christensen, Salt Lake City, Utah

Application May 20, 1930, Serial No. 454,105

25 Claims. (Cl. 263—21)

This invention relates to methods and apparatus for the treatment of solids with gaseous media to bring about chemical reaction between the solids and gases or to cause physical changes in the solids by contact with the gases or to cause chemical changes in gases on contact with solids. It is especially designed to treat the solids in a finely divided condition so as to bring about the desired chemical reactions or physical changes most rapidly and efficiently. The invention is also especially designed for the treatment of the solids with the proper proportion of gaseous reagent or gaseous medium to bring about the desired chemical reactions or physical changes under the most favorable conditions. The invention is also especially adapted for chemical reaction in which a gaseous phase of a definite composition or range of composition, must be produced and maintained in order to secure the desired chemical results or the desired state of chemical equilibrium. It is also especially adapted to the heat treatment of solids with gases to produce chemical and physical changes under conditions which require a relatively close temperature regulation.

By means of this method and apparatus many desired metallurgical and chemical results which have hitherto not been secured by present methods and appliances may be secured with a high degree of ease and efficiency. For example iron oxide ores may be quickly and completely reduced to metallic iron, i. e., sponge iron, with a much smaller consumption of carbon than is required in the blast furnace. Other chemical and metallurgical processes may be carried out much more cheaply and efficiently than by methods now used. For example anhydrous aluminum chloride may be made from aluminum oxide, chlorine and carbon with much greater facility and at a lower cost than by the present methods which require the briquetting of the mixture of aluminum oxide and carbon.

Processes of heat treatment such as the "cooking" of gypsum for the making of various gypsum plasters may be carried out with a minimum of fuel and at a relatively very rapid rate and with relatively accurate control of the temperature of treatment.

Many other common chemical and metallurgical processes may be greatly simplified and cheapened by the use of my invention and many new chemical and metallurgical processes may also be efficiently and cheaply carried out by the use of the invention. Some of these will be discussed in connection with the following description of the method and apparatus of the invention.

The apparatus consists of a reaction chamber containing a suitably placed fan for keeping the finely divided solids in suspension in the gaseous medium or media, together with means for supplying the finely divided solids and the gaseous media and for discharging the products formed. The apparatus may be used for treatment in batches or for treatment during continuous flow through the device. In such continuous treatment the flow of solids and the gaseous medium may be either concurrent or counter-current or the solids may be retained by the apparatus and the gaseous media may be passed through the apparatus. The apparatus may be used as a single unit or as a series of units with any of the methods of relative flow of material mentioned above. For counter current flow or retention of the solid phase by the apparatus, suitable auxiliary equipment for collecting the solid material may be used. Other suitable devices for the collection of the solid or gaseous products discharged from the apparatus are also provided.

The material of which the apparatus is constructed will vary with the use to which it is put, depending on the temperatures used in the processes and the character of the gaseous and solid materials treated.

The methods of using the apparatus are illustrated by the accompanying diagrammatic drawings and by descriptions of some of the processes which may be carried out by use of this method and apparatus. Fig. I shows a vertical section of a general form of the apparatus which may be used for the treatment of batches. Fig. II shows a vertical section on line $y$—$y$ of Fig. IIA and Fig. IIA a horizontal section on line $x$—$x$ of Fig. II of a general form of the apparatus preferred for use with a continuous concurrent flow of material. Fig. III shows a section of a series of chambers used in concurrent flow and Figs. IV, IVA and IVB, an arrangement for counter current flow of solids and gases. Fig. IV is a diagrammatic horizontal section and plan view on the line $c$—$c$ of Fig. IVB with the feeding devices and passages indicated in full lines in plan (rather than as dotted lines when not in the plane of the section) so as to make the flow of material clear. Figs. IVA and IVB are vertical sections on the lines $a$—$a$ and $b$—$b$, respectively, of Fig. IV. Fig. V shows an arrangement for retaining the solid reagent or catalyst in the apparatus and passing the gases through the apparatus. All the drawings are diagrammatic and are to be interpreted as described in the following descriptions and are not to be regarded as design drawings.

As previously stated the apparatus consists of a closed reaction chamber of suitable size and constructed of materials suitable for the chemical or metallurgical operation to be carried out in it, a fan in the lower part of the chamber operated at such a speed as to keep the solids in suspension in the gaseous media, a number of suitable inlet pipes for supplying the solid and gaseous material, suitable outlet pipes for discharging the gaseous and solid material, and if found to be advantageous, suitable settling chamber for settling of the solids, or condensers or condensing chambers, for condensing volatilized products issuing from the chamber, suitable dust collectors, filters or precipitators for preventing loss of fine solids (dust), suitable gas holders for collecting gaseous products used in the processes, together with suitable pipes, fans, elevators, etc., for handling the gaseous and solid materials used or produced, and suitable burners, heating elements, heating pipes, coolers, etc., for producing the desired conditions in various steps of the processes being carried out.

The method of using the invention for the treatment of batches is illustrated in Fig. I. This form of the apparatus consists of a reaction chamber (1), preferably oval in vertical section as shown and circular in horizontal section, with a fan (2) in the lower part of the chamber arranged to circulate the gas in the chamber as indicated by the arrows. The finely divided material to be treated is admitted through the inlet pipe (3) which may be sealed by a suitable cover (5). The gaseous reagent is admitted through the inlet pipe (4) which may be closed by means of a suitable valve (12). The settled treated solids are discharged from the chamber through the outlet pipe (6) which is sealed by a suitable cover (13). The fan (2) is driven from outside the chamber by means of the shaft (14), which passes through the packing gland (15) in the bottom of the chamber, and pulley or sheave (16). The shell (17) of the chamber (1) may be of any material suitable for the operation to be carried on within the chamber (1). For some purposes the shell (17) may be of iron or steel alone and in other cases may be of iron or steel lined with suitable refractory lining (18) which will not be injured or too rapidly destroyed by the operation to be carried on within the chamber. For low temperature operations which permit of the use of an unlined metal shell (17) this shell may be jacketed to maintain the proper temperature or suitable heating coils may be placed in the chamber (1). For operations carried on at higher temperatures and requiring lining (18) of the shell (17), the required temperature may be maintained by means of suitable refractory electrical heating elements (19) placed in the shell. The process within the chamber may be carried out at atmospheric pressure, or at such higher pressures as required by constructing the shell to withstand such pressures. The fan (2) must also be of material suitable for the conditions required in the chamber.

Such a form of the apparatus may be used for processes such as the manufacture of red lead from litharge, barium peroxide from barium oxide, chromates from chromic oxide and oxides of lead, magnesium, zinc etc. For example the manufacture of red lead, $Pb_3O_4$, from litharge, PbO, may be carried out as follows: The chamber (1) is heated to a temperature of 425°–450° C. and filled with oxygen through the inlet pipe (4), the fan (2) is started and the batch of finely pulverized litharge, preferably preheated to 425°–450° C. is slowly added through the inlet pipe (3) which is then closed by the cover (5). The ratio of gas to solids in the chamber must be such that the circulating gas can carry the solids in suspension at the velocity given the gases by the fan. As the oxygen is absorbed by the litharge more oxygen enters through the inlet pipe (4) until the reaction is completed. When the reaction is finished the fan is stopped, the red lead is allowed to settle and is then withdrawn through the outlet pipe (6) which is thereafter closed by means of the cover plate (13). The fan is then started again and another batch of litharge is added and oxygen supplied, through the gas inlet pipe (4) as previously described. The proper temperature of 425°–450° C. is maintained during the process by passing an electric current through the heating elements (19) within the chamber (1). If desired the process may be carried out with air under pressure instead of oxygen at substantially atmospheric pressure. In this case a considerable excess of air must be used and the pressure should preferably be sufficient to secure a partial pressure of oxygen in the apparatus at approximately one atmosphere or more when the reaction is completed. The method of manufacturing the other peroxidized compounds mentioned above and of conducting other similar batch operations by means of the invention will be apparent from the foregoing.

For continuous operation, i. e., an operation in which the reacting materials are passed through the device continuously, a form of the apparatus such as shown in Fig. II is preferred. This type of apparatus has a much wider field of application than the batch apparatus such as described and the operations which may be carried out with it are of much more importance. The form of the reaction chamber (1a) in this type of the apparatus is preferably approximately oval in the vertical section perpendicular to the fan shaft as shown in Fig. II and rectangular in the horizontal section parallel with the fan shaft and also in horizontal section, as shown in Fig. IIA. The horizontal fan (2a) is arranged to rotate in the lower part of the chamber (1a) on the shaft (14a) so as to circulate the gaseous medium and the finely divided solids as indicated by the arrows. The shaft (14a) passes through the bearing glands (15a) in the end walls and is rotated by means of the drive pulley or sheave (16a). Gaseous medium (or media) is introduced through the inlet pipe (4a) by means of the fan (20). The finely divided solid to be treated is added through the inlet pipe (3a) by means of the feeder (21). Other solids taking part in the reaction may be introduced through other feeders (22) and (23) and inlet pipes (24) and (25). Other gaseous reagents may be introduced through other inlet pipes (30). All of these inlets are placed at one end of the reaction chamber (1a) and the outlet pipe, or opening, (7a) leading to the settling chamber (8a) is placed at the opposite end of the chamber (1a). The walls of the chamber (18) are made of material which will resist the reagents and conditions in the chamber and will vary with the processes being carried out. For high temperatures the bearings (15a) and fan shaft (14a) may be water cooled. The fan blades and the shaft covering inside the chamber are also made of suitable material to resist the conditions in the chamber.

The method of using this form of the apparatus for a number of important uses is briefly discussed in the following, some of the more important and valuable applications being described first. It will be noted that in all these applications the flow of gases and solids through the reaction chamber (1a) is concurrent which is of particular importance in carrying out some of these processes.

Probably the most important metallurgical process to which this method and apparatus are applicable is the direct reduction of the oxidized ores of iron to metallic iron or sponge iron. The manufacture of sponge iron by my method and apparatus as illustrated by Figs. II and IIA is briefly as follows:

With the fan (2a) in operation air is blown into the chamber (1a) through the inlet pipe (4a) by the fan (20) and coal or coke dust is fed in a constant stream into the stream of air by the feeder (22) in such proportion as to give complete combustion of this fuel to $CO_2$. After sufficient of these hot gases has passed through the chamber (1a) to heat the chamber (1a) to the required or desired temperature finely divided iron ore is fed in a constant stream into the chamber (1a) by the feeder (21) and more coke dust (or coal dust) is fed into the chamber (1a) in constant stream through the feeder (23). If preferred the finely powdered iron ore and coke dust may be mixed in the proper proportions and fed together through either one of the feeders (21) or (23). The iron ore, or mixture of iron ore and coke dust, is preferably heated to the required temperature before being fed into the reaction chamber. The amounts of iron oxide, coke dust and oxygen (in the air) supplied are so proportioned as to secure the proper reducing atmosphere and temperature and the mixture is passed concurrently through the chamber (1a) being mixed and the solids kept in suspension in the gases by means of the fan (2a), all of the charge both solid and gas being fed into the chamber (1a) at one end and being discharged from the chamber (1a) at the other end through the outlet (7a) into the settling chamber (8a). The flow of solids and gases through the reaction chamber (1a) is concurrent and substantially uniform and at the same rate. During this passage through the chamber (1a) the reactions discussed below take place reducing the finely divided iron oxide to the metallic condition. To bring about this reduction two essential metallurgical conditions should be maintained, first, the temperature should be high enough so that the reaction, $$xC + xO_2 = xCO + xCO_2$$

goes to completion, i. e., so that all the solid carbon introduced forms either CO or $CO_2$; second, the temperature and the ratio of CO to $CO_2$ in the atmosphere resulting from the reaction $$Fe_2O_3 + 3CO + xCO_2 = Fe_2 + 3CO_2 + xCO_2$$

must be such that the iron is completely reduced, i. e., the temperature, and the ratios of $Fe_2O_3$, C, and $O_2$ introduced into the reaction chamber must be such that the condition of equilibrium resulting from the complete reaction $$Fe_2O_3 + 3C + xCO_2 = Fe_2 + 3CO + xCO_2$$

is such that the iron is completely reduced. Two other conditions are also essential, first, sufficient time must be allowed to bring about the required reactions before the mixed products are discharged from the reaction chamber (1a) and, second, the ratio of solids to gases in the chamber must be such that the fan (2a) is able to keep the solids in suspension in the gases and maintain a uniform mixture and uniform discharge from the chamber (1a). A study of the equilibrium diagram of the system Fe—FeO—CO—$CO_2$ indicates that the complete reduction to Fe may be secured at temperatures varying from approximately 550° C. to 1050° with percentages of CO in the resultant atmosphere varying from 55 to 75. The equilibrium diagram of the system C—CO—$CO_2$ shows that to ensure such percentages of CO the temperatures must be from 675° to 760° respectively. Since these temperatures and percentages of CO in the final atmosphere are the lower limits for safety, to secure rapidity and completeness of the reactions the process should preferably be carried out at a temperature between 800° and 900° C. (or higher) and with a percentage of CO in the final or resultant atmosphere between 80% and 90%. The following chemical equations show the results secured with different ratios of C and O to $Fe_2O_3$.

1. $Fe_2O_3 + 10C + 4O_2 = 2Fe + 9CO + CO_2$
   $-195600 \quad\quad +262440 + 97200 = +164040$
2. $Fe_2O_3 + 10C + 4\tfrac{1}{2}O_2 = 2Fe + 8CO + 2CO_2$
   $-195600 \quad\quad +233280 + 194400 = +232080$
3. $Fe_2O_3 + 10C + 5O_2 = 2Fe + 7CO + 3CO_2$
   $-195600 \quad\quad +204120 + 291600 = +300120$
4. $Fe_2O_3 + 9C + 3\tfrac{1}{2}O_2 = 2Fe + 8CO + CO_2$
   $-195600 \quad\quad +233280 + 97200 = +134880$
5. $Fe_2O_3 + 9C + 4O_2 = 2Fe + 7CO + 2CO_2$
   $-195600 \quad\quad +204120 + 194400 = +202920$
6. $Fe_2O_3 + 9C + 4\tfrac{1}{2}O_2 = 2Fe + 6CO + 3CO_2$
   $-195600 \quad\quad +174960 + 291600 = +270960$
7. $Fe_2O_3 + 8C + 3O_2 = 2Fe + 7CO + CO_2$
   $-195600 \quad\quad +204120 + 97200 = +105720$
8. $Fe_2O_3 + 8C + 3\tfrac{1}{2}O_2 = 2Fe + 6CO + 2CO_2$
   $-195600 \quad\quad +174960 + 194400 = +173760$
9. $Fe_2O_3 + 7C + 2\tfrac{1}{2}O_2 = 2Fe + 6CO + CO_2$
   $-195600 \quad\quad +174960 + 97200 = +76560$
10. $Fe_2O_3 + 6C + 2\tfrac{1}{2}O_2 = 2Fe + 5CO + CO_2$
    $-195600 \quad\quad +145800 + 97200 = +47400$ These equations indicate that a considerable range of variation in the ratios of C and O to $Fe_2O_3$ are possible with this method and apparatus. The ratios used will depend upon the conditions of operation, such as heat lost by radiation from the chamber (1a), the amount of preheat of the iron ore and air and whether the reduction is carried out in two stages, $Fe_2O_3$ to FeO and FeO to Fe, or with preliminary heating of air and ore followed by two stage reduction as described below in connection with Fig. IV. By burning the waste gases and using their heat to preheat the iron ore, coke dust and air, the amount of coke dust and air may be reduced from the high proportions indicated in Equations 1 and 2 toward the minimum proportions indicated in Equations 9 and 10.

The iron dust settled out of the hot reducing atmosphere in the settling chamber (8a) is removed by a suitable conveyor (27) (preferably a water-cooled screw conveyor) and passed through a suitable water-jacketed cooler (28) (such as a screw conveyor with jacketed troughs shown for cooling with air or water) and cooled to atmospheric temperature in this reducing atmosphere before being discharged into contact with the atmosphere. If desired both the gas and iron from the reducing chamber (1a) may be cooled in the settling chamber (8a) by means of cooling tubes in the settler (8a) through which air, or water, is passed, and by means of a water-cooled screw and trough (27) in the lower part of the settling chamber. The hot gases from which the iron is settled out leave the chamber (8a) through the outlet (26). These gases being high in CO are preferably burned and used to preheat the air and iron ore and coke before they are introduced into the chamber (1a).

To keep the chambers (1a) within reasonable size and to allow sufficient time of treatment, a number of reducing chambers may be used in series as shown in Fig. III, the first of the series (1a) having the feeders etc., described in Fig. II and the others 1B, 1C, etc., merely openings (29) connecting with each other and with a final settling chamber (8b) having discharge conveyor (27b) with cooling trough (28b) as described for Fig. II.

The utilization of the invention, both method and apparatus, for counter-current flow of gaseous and solid ingredients of the charge, is illustrated in Figs. IV, IVA and IVB. Fig. IV shows a horizontal sectional view and Figs. IVA and IVB vertical sectional views on lines a—a and b—b respectively of Fig. IV. This arrangement consists of three reaction chambers (1H), (1P) and (1R) and settling chambers (8H), (8P) and (8R) arranged in series as shown. The use of this arrangement will be described as applied to the reduction of iron ore since this process may be carried out in three stages, a heating stage followed by preliminary reduction and final reduction stages, carried out successively in reaction chambers (1H), (1P) and (1R). The flow of solids is indicated by a solid line and gases by a dotted line. The finely pulverized iron oxide ore (previously heated by means of waste gases if desired) is fed into the heating chamber (1H) through the inlet opening (3c) by means of the feeder (21c) and air (preferably preheated by counter-current heat interchange with the hot waste gases as indicated) in sufficient quantity to burn the residual gases from chamber (1P) is introduced through the inlet opening (40). The partly oxidized gases from the preliminary settling chamber (8P) enter the chamber (1H) through the opening (41) and are burned by the air admitted through (40), heating the incoming ore from the feeder (21c). The mixture of fine ore and hot burned gases kept in suspension by the fan (2H), passes through the heating chamber (1H) and into the settling chamber (8H) through the opening (50) where the solids settle out on the hoppered bottom (70) of the chamber and flow into the preliminary reduction chamber (1P) through the inlet opening (30) and the hot waste gases pass out through the opening (51) and are utilized in the counter-current heat interchangers (80) to preheat the air (and coke dust if desired).

The heated ore from settling chamber (8H) entering the preliminary reduction chamber (1P) through (30) meets the reducing gases from the final reduction chamber (1R) and settler (8R) which enters the preliminary reduction chamber (1P) through the opening (43). The hot ore held in suspension in the gases by means of the fan (2P) is reduced to FeO (and possibly partially to Fe depending on the conditions) during the passage of the mixture of ore and hot gases through the chamber (1P). The mixture of partially reduced ore (FeO) and hot gases passes from the reducing chamber (1P) into the settling chamber (8P) where the ore settles out into the hoppered bottom (71) of the chamber and flows into the final reduction chamber (1R) through the opening (31). The hot gases from (8P) pass through the opening (41) into the heating chamber (1H) as previously described. In the final reduction chamber (1R) the partially reduced ore meets the reducing gases generated by the reaction between the hot air entering the chamber from the preheater (80) through the opening (44) and the (preferably heated) coke (or coal) dust fed into the chamber (1R) by the feeder (22c). The ore held in suspension in these hot reducing gases by the fan (2R) passes through the chamber (1R) into the settling chamber (8R) where the reduced iron dust (and gangue) settles out upon the hoppered bottom (81) of the chamber and runs into the water cooled feeder (28c) which cools the ore substantially to atmospheric temperature before discharging it into the atmosphere (or discharges it into other suitable cooling device in which the iron is cooled before coming into contact wth air or other oxidizing gases). The hot reducing gases from the settling chamber (8R) pass through the opening (43) into the chamber (1P), as previously described. To prevent flow of gas through openings (30) and (31) rotating fan gates or feeders (60) are placed in these openings and arranged to allow the passage of the ore from the settling chambers (8H and 8P) into the reduction chambers (1P and 1R) but to prevent flow of gases from the reducing chambers (1P and 1R) into the settling chambers (8H and 8P). The reactions occurring in the respective chambers are as follows: In the final reduction chamber the partially reduced ore and the carbon (coke dust) and hot air are so proportioned as to secure the proper atmosphere and temperature for reduction to metallic iron as indicated in the following equations:

12. $2FeO + 8C + 3\frac{1}{2}O_2 = 2Fe + 7CO + CO_2$
$-128600 \qquad\qquad +204120 + 97200 = +172{,}720$ 13. $2FeO + 8C + 4O_2 = 2Fe + 6CO + 2CO_2$
$-128600 \qquad\qquad +174960 + 194400 = +240760$ 14. $2FeO + 7C + 3O_2 = 2Fe + 6CO + CO_2$
$-128600 \qquad\qquad +174960 + 97200 = +143560$ 15. $2FeO + 6C + 2\frac{1}{2}O_2 = 2Fe + 5CO + CO_2$
$-128600 \qquad\qquad +145800 + 97200 = +114400$ 16. $2FeO + 5C + 2O_2 = 2Fe + 4CO + CO_2$
$-128600 \qquad\qquad +116640 + 97200 = +85240$ In chamber (1P) the reducing gas from chamber (1R) is mixed with the heated ore from the heating chamber (1H) and the following equations indicate the reaction which occurs in reducing the iron oxide to the ferrous condition.

17. $Fe_2O_3 + 7CO + CO_2 = 2FeO + 6CO + 2CO_2$
    $-195600 - 204120 - 97200 + 128600 + 174960 + 194400 = +1040$

18. $Fe_2O_3 + 6CO + 2CO_2 = 2FeO + 5CO + 3CO_2$
    $-195600 - 174960 - 194400 + 128600 + 145800 + 291600 = +1040$

19. $Fe_2O_3 + 5CO + CO_2 = 2FeO + 5CO + 2CO_2$
    $-195600 - 174960 - 97200 + 128600 + 145800 + 194400 = +1040$

20. $Fe_2O_3 + 5CO + CO_2 = 2FeO + 4CO + 2CO_2$
    $-195600 - 145800 - 97200 + 128600 + 116640 + 194400 = +1040$

21. $Fe_2O_3 + 4CO + CO_2 = 2FeO + 3CO + 2CO_2$
    $-195600 - 116640 - 97200 + 128600 + 87480 + 194400 = +1040$

From these equations it will be seen that the reaction in reducing the iron oxide to the ferrous condition with the gases from the final reduction chamber (1R) is only very slightly exothermic but the resulting gases have a sufficient proportion of CO to reduce the ferric oxide to the ferrous condition at any temperature at which the reaction will go on. Since the temperatures at which this reaction will proceed rapidly are lower than those required for rapid reduction of the iron in (1R) and the reaction is slightly exothermic, there is no need for extraneous heating in the chamber (1P) if the preliminary heating in the heating chamber (1H) has raised the ore to a high enough temperature.

In the heating chamber (1H) the residual CO in the gases from the preliminary reduction chamber (1P) is burned with hot air from the counter-current heater (80) to furnish the heat for heating the ore as indicated by the following equation:

22. $6CO + 3O_2 = 6CO_2$
    $-174960 + 583200 = +408240$

23. $5CO + 2\frac{1}{2}O_2 = 5CO_2$
    $-145800 + 486000 = +340200$

24. $4CO + 2O_2 = 4CO_2$
    $-116640 + 388800 = +272160$

25. $3CO + 1\frac{1}{2}O_2 = 3CO_2$
    $-87480 + 291600 = +204120$

By efficient insulation of the apparatus against heat loss and with efficient use of the hot waste gas in pre-heating the air, ore and coke, the consumption of coke per ton of iron produced by this method, as indicated by Equations 16, 21 and 25, may be reduced to nearly 50% of the weight of iron. As the coke "dust" is used the cost of coke would also be greatly reduced. The cost of passing the gases through the chamber would also be relatively small, so that the total cost of producing iron by this method should compare very favorably with blast furnace production costs.

The use of the apparatus for bringing about reactions between gases by means of a solid catalyst is illustrated in Fig. V, the example chosen being the iron oxide process of converting $SO_2$ to $SO_3$. The pulverized iron oxide catalyst is preferably first air separated to remove the finest dust so that a product which settles rapidly is secured. The method of carrying out this process is briefly as follows: The reaction chamber (1d) is first heated to the required temperature. With the fan (2d) in operation, the catalyst is introduced through the opening (3d). The $SO_2$ gases, mixed with the required proportion of dry air, preheated to the required temperature, are continuously introduced into the chamber (1d) through the inlet (4d) and is passed through the chamber (1d) in contact with the catalyst which are kept in suspension in the gas by means of the fan (2d). The mixture of catalyst and treated gas passes out through the outlet (7d) to the settling chamber (8d) in which the catalyst settles out and flows back into the reaction chamber (1d) through the opening 26d and passages (30d) and (3d) and from which the treated gases are discharged through the opening (36d). The catalyst is thus continuously passed through and returned to the reaction chamber 1d, while the gases pass through the reaction chamber 1d and are discharged from the settler (8d) through the outlet opening (36d) to the apparatus for absorption of the $SO_3$. During the passage of the gases through the chamber (1d) in contact with the catalyst the $SO_2$ is converted to $SO_3$ according to the well known reaction indicated below:

$$SO_2 + O = SO_3$$

If desired, the $SO_3$ gases may be passed through a similar reaction chamber in contact with zinc oxide or roasted zinc ore to make $ZnSO_4$ according to the following reaction $$ZnO + SO_3 = ZnSO_4$$

A large number of other important processes may be carried out by my method and apparatus. For example, the manufacture of anhydrous aluminum chloride may be carried out in the form of apparatus shown in Figs. II and IIA by supplying a condensing chamber, following the settling chamber (8a), in which the gases are cooled and the $AlCl_3$ is precipitated out of the gases. The process may be carried out as follows: The powdered $Al_2O_3$, mixed with the required amount of powdered coke or charcoal, (preheated to the desired temperature) is continuously introduced through the feeder (21) (or the coke dust may be separately fed through the feeder (23). Sufficient coke dust (of the total amount of coke dust required) to burn with the oxygen to form $CO_2$ is introduced through the feeder (22). Air, or oxygen, (preheated if desired) in the required amount is continuously introduced through the opening (4a) by means of the fan (20). Chlorine in the required amount is introduced through the inlet (30) from the chlorine gas holder or liquid chlorine tank (11). The $Al_2O_3$ and chlorine are introduced in the constant proportions indicated in the equations given below, but the proportions of carbon and oxygen introduced with the other ingredients may be varied according to the conditions under which the process is carried out as discussed below and as indicated in the equations given below. If little or no preliminary heating of the ingredients is used it may be necessary to use an excess of coke as indicated in the following equation:

$$Al_2O_3 + 3C + 1\tfrac{1}{2}O + 3Cl_2 = 2AlCl_3 + 3CO_2$$
$$-392600 \qquad\qquad +323600 + 291600 = +222600$$

If some preliminary heating is used the amount of carbon and air may be cut down as indicated in the following equation:

$$Al_2O_3 + 2\tfrac{1}{2}C + 3Cl_2 = 2AlCl_3 + 2\tfrac{1}{2}{-}CO_2$$
$$-392600 \qquad\qquad +323600 + 243000 = +174000$$

If the $Al_2O_3$ and carbon (and chlorine as far as possible) are heated to a high temperature before being introduced into the reaction chamber (1a) the required amount of air and carbon may be reduced until they approach the limits indicated in the following equation (i. e., the minimum of carbon and no air or oxygen):

$$Al_2O_3 + 1\tfrac{1}{2}C + 3Cl_2 = 2AlCl_3 + 1\tfrac{1}{2}CO_2$$
$$-392600 \qquad\qquad +323600 + 145800 = +76800$$

To secure efficient condensation it is desirable to reduce the gases mixed with the $AlCl_3$ to a minimum and the condition indicated in the last equation should therefore be approached as nearly as possible. In all cases it is preferable to introduce a slight excess of carbon and $Al_2O_3$ so as to consume all the Cl and O before the gases leave the reaction chamber. Any excess of $Al_2O_3$ will be caught in the settling chamber. By the foregoing method the waste gases from the process may be substantially all $CO_2$ instead of practically all CO as is the case in the processes now in use. This results in a saving of substantially one half of the carbon and reduces the volume of gas mixed with the $AlCl_3$ to substantially one half the volume, as compared with these processes. The necessity of mixing and briquetting the $Al_2O_3$ and carbon and the labor of charging the furnace is also avoided in my process.

For heating operations such as the "cooking" of gypsum to make gypsum plasters of various kinds this method and apparatus may also be used to advantage as briefly described below, referring to Figs. II and IIA. The chamber (1a) is preheated to the desired cooking temperature by burning coal dust (or fuel gas) from the feeder (22) (or gas supply pipe) and air from the fan (20) in amount required for the combustion of the fuel. With the chamber at the desired temperature the finely divided gypsum is continuously fed into the chamber (1a) through the feeder (21) and opening (3a) and coal dust and air are continuously supplied through the opening (4a) by the feeder (22) and fan (20) in sufficient amount to heat the gypsum to the required temperature and drive off the required amount of moisture and to keep the chamber at the required temperature. The finely powdered gypsum is kept in suspension in the hot gases by the fan (2a) and in passing through the chamber is dehydrated to the desired point and is discharged through the opening (7a) into the settling chamber (8a) where the dehydrated gypsum settles out and is discharged by the conveyor (27). The hot steam and waste gases leaving the settling chamber (8a) through the outlet (26) may be passed through a counter-current heat interchanger to preheat the incoming air and thus increase the fuel economy if desired. For the "cooking" of ordinary plaster the reaction within the chamber is indicated in the following equation:

$$CaSO_4 \cdot 2H_2O = CaSO_4 \cdot \tfrac{1}{2}H_2O + 1\tfrac{1}{2}H_2O.$$
$$xC + xO_2 = xCO_2$$

By this method a rapid and complete "cooking" may be secured with a minimum fuel consumption, particularly if the waste gases are used to preheat the air used in the process.

The method and apparatus may also be used to great advantage for the reduction of sulphates such as $BaSO_4$, $CaSO_4$ and $Na_2SO_4$, to sulphides. These reducing operations may be carried out in the apparatus shown in Figs. II and IIA as described below. The finely powdered (and preferably preheated) sulphates and the required amount of reducing agent (coke or coal dust) are continuously introduced into the reducing chamber (1a) through the inlet (3a) by means of the feeder (21) and the required proportion of air is continuously introduced into the reducing chamber (1a) through the inlet (4a) by means of the fan (20). The fan (2a) keeps the solids in suspension in the gases during the passage of the mixture through the chamber (1a). During this treatment the sulphates are reduced to sulphides. The mixture of sulphides and gases passes through the outlet (7a) into the settling chamber (8a) in which the sulphides settle out and from which the waste gases are discharged through the outlet (26). The ratio of CO to $CO_2$ in the gases required for this reduction is similar to that required for the reduction of iron from the oxide, though a lower partial pressure of CO may be used. The waste gases which contain a large amount of CO should therefore be burned and used to preheat the incoming sulphates and air. The reactions taking place in the reaction chamber (1) are indicated in the following equation:

$$\text{``M''}SO_4 + wC + xO_2 = \text{``M''}S + yCO + zCO_2$$

Though the use of carbon as a reducing agent is exclusively indicated in the foregoing descriptions, it will be apparent that other suitable reducing agents such as hydrogen, methane, volatilized oils, etc., may be used instead of carbon (in the form of coke dust, coal dust, charcoal dust, dried saw dust etc.,).

The production of hydrogen may also be carried out by my invention in a number of different ways. For example, finely pulverized iron oxide ore is first reduced to ferrous oxide or metallic iron by reduction with coke dust (or coal dust) as previously described and the ferrous oxide or iron powder then be treated with superheated steam in a reaction chamber (1a) by passing the superheated steam and hot reduced iron product through the reaction chamber together in the right proportions. The reactions taking place during the passage through the chamber are as given below:

$$3Fe + 4H_2O = Fe_3O_4 + 4H_2$$
$$3FeO + H_2O = Fe_3O_4 + H_2$$

The $Fe_3O_4$ is settled out in the settling chamber (8a) and reduced and used over again.

The production of hydrogen from water gas may also be carried out by the invention in a similar manner by passing the hot mixture of CO and H together with finely divided lime or calcium hydroxide into the reaction chamber, the following reactions taking place in the passage of the mixture through the chamber:

$$CO + H_2O + CaO = CaCO_3 + H_2$$
$$-29160 - 58060 - 131500 + 273850 = +55130$$
$$CO + Ca(OH)_2 = CaCO_3 + H_2$$
$$-29160 - 215600 + 273850 = +29090$$

Since these reactions are exothermic and should be carried out respectively approximately at 450° C. and 260° C. for best results the chamber (1a) must be supplied with cooling tubes or jackets to carry away the heat generated. Water pipes and air pipes may be placed within the chamber and this heat may be thus used to make the steam and preheat the air used in making the water gas.

The CaO dust for the above process of making H from water gas may be readily made from the CaCO₃ produced in that process by heating it in the reaction chamber (to decompose the CaCO₃ and form CaO) in the manner described for "cooking" gypsum except that the treatment must be carried out at a much higher temperature (900° C. or higher). The conditions in the treatment are indicated in the following equation:

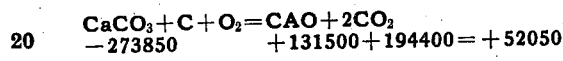

By using the hot waste gases to heat the incoming air the amount of coal dust and air required as indicated in the above equation may be approached or even slightly bettered. The hot CaO settled out in the settling chamber (8a) may be fed directly into the reaction chamber (1a) for the production of the hydrogen as noted above or may be precooled if desired.

Many other useful practical applications of my invention might be described such as the roasting of finely powdered sulphide ores of zinc, copper, etc., or the reduction of oxidized ores of copper preliminary to concentration by flotation, etc., etc., but these uses and many others will be easily understood from the other examples given in the specification.

The great utility and value of my invention will be apparent from the foregoing descriptions. Its efficiency will also be apparent from the fact that the intimate mixture of finely divided solids in the gaseous media approaches the conditions present in a solution so that complete and rapid reactions are made possible between the solids and gases.

Having described my invention, what I claim and desire to patent is:

1. Apparatus for treating finely divided solids with gaseous media which comprises a treatment chamber; inlet means for introducing finely divided solids and gases into said chamber; rapidly rotatable impelling means within said chamber arranged to circulate the gaseous medium within said chamber and to bring said finely divided solids into suspension in said gaseous medium and to circulate said supension within said chamber; and means for withdrawing treated products from said chamber.

2. Apparatus for treating finely divided solids with gaseous media which comprises a treatment chamber; inlet means for introducing finely divided solids and gases into said chamber; rapidly rotatable impelling means within said chamber arranged to circulate the gaseous medium within said chamber and to bring said finely divided solids into suspension in said gaseous medium and to circulate said suspension within said chamber; means for withdrawing treated products from said chamber; and means for heating said solid and gaseous medium during circulation in said chamber.

3. Apparatus for treating finely divided solids with gaseous media to bring about chemical changes in either or both, which comprises a treatment chamber; inlet means for introducing finely divided solids and gaseous media into said chamber; rapidly rotatable impelling means within said chamber, arranged to circulate said gaseous medium within said chamber and to bring said solids into suspension in said gaseous medium and to circulate said suspension within said chamber; and means for withdrawing treated products from said chamber.

4. Apparatus for treating finely divided solids with gaseous media to bring about chemical changes in either or both, which comprises a treatment chamber; inlet means for introducing finely divided solids and gaseous media into said chamber; rapidly rotatable impelling means within said chamber, arranged to circulate said gaseous medium within said chamber and to bring said solids into suspension in said gaseous medium and to circulate said suspension within said chamber; means for withdrawing treated products from said chamber; and means for heating said solids and gaseous medium during circulation in said chamber.

5. Apparatus for treating finely divided solids with gaseous media to bring about chemical changes in either or both, which comprises a chamber defining a reaction zone; means for introducing finely divided solid material and gaseous medium into said zone; moving impelling means in said chamber for forming a suspension of the finely divided solid material in the gaseous medium in said zone and for moving said suspension in a circuit within said zone; and means for withdrawing treated products from said zone.

6. The apparatus for treating finely divided solids with gaseous media which consists of a horizontally elongated reaction chamber having a horizontally arranged fan in the lower part thereof extending lengthwise of said chamber and arranged to rotate at such speed as to circulate the gaseous medium in said chamber with sufficient velocity to keep the finely divided solids in suspension in said gaseous medium in said chamber; means for rotating said fan and means for continuously feeding said finely divided solids and said gaseous media into one end of said chamber and means for continuously discharging the treated products at the other end of said chamber.

7. The apparatus for treating finely divided solids with gaseous media, which comprises a horizontally elongated treatment chamber; a horizontally disposed, rapidly rotatable fan within said chamber and extending lengthwise of said chamber; means for supplying finely divided solids and gaseous medium to said chamber at one end; and means for withdrawing the mixture of treated products at the other end of said chamber.

8. The apparatus for treating finely divided solids with gaseous media, which comprises a horizontally elongated treatment chamber; a horizontally disposed, rapidly rotatable fan within said chamber and extending lengthwise of said chamber; means for supplying finely divided solids and gaseous medium to said chamber at one end; means for withdrawing the mixture of treated products at the other end of said chamber; and means for heating said solids and gaseous medium during their passage through said chamber.

9. The apparatus for treating finely divided solids with gaseous media, which comprises a horizontally elongated treatment chamber adapted to contain a suspension of finely divided solid material in a gaseous medium; a horizontally disposed and rapidly rotatable fan within said chamber and extending lengthwise of said chamber and arranged to operate within said chamber so as to circulate the gaseous medium in said chamber and to keep the finely divided solids in suspension in the gaseous medium in said chamber; means for supplying finely divided solid material and gaseous medium to said chamber at one end thereof; and means for withdrawing the treated mixed products at the other end of said chamber.

10. The apparatus for treating finely divided solids with gaseous media, which comprises a horizontally elongated treatment chamber adapted to contain a suspension of finely divided solid material in a gaseous medium; a horizontally disposed and rapidly rotatable fan within said chamber and extending lengthwise of said chamber and arranged to operate within said chamber so as to circulate the gaseous medium in said chamber and to keep the finely divided solids in suspension in the gaseous medium in said chamber; means for supplying finely divided solid material and gaseous medium to said chamber at one end thereof; means for withdrawing the treated mixed products at the other end of said chamber; and means for heating solid and gaseous material during passage through said chamber.

11. Apparatus for treating mixtures of finely divided solids and gaseous media, which comprises a horizontally elongated treatment chamber having a fan in the lower part thereof extending lengthwise of said chamber and arranged to rotate at such a speed as to circulate the gaseous medium in said chamber with sufficient velocity to keep the finely divided solids in suspension in the gaseous medium; means for rotating said fan; and means for continuously feeding finely divided solid material and gaseous medium into said chamber at one end, and means for continuously discharging the treated mixture at the other end of said chamber.

12. Apparatus for treating mixtures of finely divided solids and gaseous media, which comprises a horizontally elongated treatment chamber having a fan in the lower part thereof extending lengthwise of said chamber and arranged to rotate at such a speed as to circulate the gaseous medium in said chamber with sufficient velocity to keep the finely divided solids in suspension in the gaseous medium; means for rotating said fan; means for continuously feeding finely divided solid material and gaseous medium into said chamber at one end, means for continuously discharging the treated mixture at the other end of said chamber; and means for heating said mixture during its passage through said chamber.

13. The apparatus for treating finely divided solids with gaseous media for the purpose of bringing about chemical changes in ingredients of a mixture of such said solid and gaseous materials which consists of the combination of a horizontally elongated reaction chamber arranged to contain a suspension of such said finely divided solid material in such said gaseous medium and a horizontally disposed and rapidly rotatable fan within said chamber, extending lengthwise of said chamber, and arranged for operation within said chamber so as to circulate the gases within said chamber in such a manner as to keep the finely divided solid material in said chamber in suspension in the gases in said chamber, together with means for supplying said finely divided solid material and said gaseous material to said chamber at one end and means for withdrawing the mixed products of said treatment at the other end of said chamber.

14. The apparatus for treating finely divided solids with gaseous media for the purpose of bringing about chemical changes in ingredients of a mixture of such said solid and gaseous materials which consists of the combination of a horizontally elongated reaction chamber arranged to contain a suspension of such said finely divided solid material in such said gaseous medium and a horizontally disposed and rapidly rotatable fan within said chamber, extending lengthwise of said chamber, and arranged for operation within said chamber so as to circulate the gases within said chamber in such a manner as to keep the finely divided solid material in said chamber in suspension in the gases in said chamber, together with means for supplying said finely divided solid material and said gaseous material to said chamber at one end and means for withdrawing the mixed products of said treatment at the other end of said chamber and means for heating the mixture of solid and gaseous material during treatment in said chamber.

15. The apparatus for treating finely divided solids with gaseous media for the purpose of bringing about chemical changes in ingredients of a mixture of such said solid and gaseous material which consists of the combination of a horizontally elongated reaction chamber having a trough-like floor and a ceiling of approximately semicircular shape in vertical cross-section and arranged to contain and direct the circulation of a suspension of such said finely divided solid material in such said gaseous medium, and a horizontally disposed and rapidly rotatable fan within said chamber extending lengthwise of said chamber in said trough-like bottom of said chamber and so arranged and operated within said chamber as to circulate the gases within said chamber in paths the planes of which are approximately at right angles to the longitudinal axis of the chamber and fan and in such a manner as to keep the finely divided solid material in said chamber in suspension in the gases in said chamber.

16. The apparatus for treating finely divided solids with gaseous media for the purpose of bringing about chemical changes in ingredients of a mixture of such said solid and gaseous material which consists of the combination of a horizontally elongated reaction chamber having a trough-like floor and a ceiling of approximately semicircular shape in vertical cross-section and arranged to contain and direct the circulation of a suspension of such said finely divided solid material in such said gaseous medium, and a horizontally disposed and rapidly rotatable fan within said chamber extending lengthwise of said chamber in said trough-like bottom of said chamber and so arranged and operated within said chamber as to circulate the gases within said chamber in paths the planes of which are approximately at right angles to the longitudinal axis of the chamber and fan and in such a manner as to keep the finely divided solid material in said chamber in suspension in the gases in said chamber, together with means for supplying said finely divided solid material and said gaseous material in the desired proportions and at the desired rate into said chamber at one end and means for discharging the mixed products of said treatment at the other end of said chamber.

17. The apparatus for treating finely divided solids with gaseous media for the purpose of bringing about chemical changes in ingredients of a mixture of such said solid and gaseous material which consists of the combination of a horizontally elongated reaction chamber having a trough-like floor and a ceiling of approximately semicircular shape in vertical cross-section and arranged to contain and direct the circulation of a suspension of such said finely divided solid material in such said gaseous medium, and a rotating horizontal fan within said chamber extending lengthwise of said chamber in said trough-like bottom of said chamber and so arranged and operated within said chamber as to circulate the gases within said chamber in paths the planes of which are approximately at right angles to the longitudinal axis of the chamber and fan and in such a manner as to keep the finely divided solid material in said chamber in suspension in the gases in said chamber, together with means for supplying said finely divided solid material and said gaseous material in the desired proportions and at the desired rate into said chamber at one end and means for discharging the mixed products of said treatment at the other end of said chamber and means for heating the mixture of solid and gaseous material in said chamber during said treatment.

18. Apparatus for treating finely divided solid material with gaseous media to bring about chemical changes in either or both, which comprises a chamber defining a reaction zone, means for introducing finely divided solid material and gaseous medium into said zone, and mechanical moving means within said chamber for applying a propelling force to the finely divided solid material and gaseous medium near the lower part of said zone to form a suspension of said solid material in said gaseous medium and to circulate the said suspension in said reaction zone.

19. Apparatus for treating finely divided solid material with gaseous media to bring about chemical changes in either or both, which comprises a chamber; means for introducing finely divided solid material and gaseous medium within said chamber, rotatable impelling means positioned within said chamber near the base thereof adapted to propel the finely divided material and gaseous medium upwardly in the form of a suspension of the solid material in the gaseous medium, the dimensions of said impelling means and said chamber being such that the suspension is circulated in said chamber.

20. Apparatus for treating finely divided solid material with gaseous media to bring about chemical changes in either or both, which comprises a plurality of reaction chambers, means for separating solids from gases operative between said reaction chambers, means for forming and agitating a suspension of finely divided solid material in a gaseous medium in each of said reaction chambers, means for conducting the said suspension from one of said reaction chambers to the said means for separating solids from gases, means for conducting solids from said separating means after separation to another of said reaction chambers, and means for passing a gaseous medium through said reaction chambers for reaction with said finely divided solid material while in suspension therein.

21. Apparatus for treating finely divided solid material with a gaseous medium to bring about chemical changes in either or both, which comprises a chamber, means or introducing a gas and finely divided material within said chamber, and finely divided material within said chamber, means for forming a suspension of the finely divided material in the gas within said chamber, means for drawing off finely divided material in suspension from said chamber, means for separating solid material from the portion of said suspension withdrawn from said chamber, means for returning to said chamber solid material separated by said separating means, and means for withdrawing gas from said separating means which has been separated therein from solid material.

22. Apparatus for bringing about chemical reactions between gases and finely divided solid material, which comprises a chamber, means for introducing a gas and finely divided solid material into said chamber, fan blades within said chamber confined to the lower part of said chamber adapted to rotate at such a speed to form a circulating suspension of solid material in the gas within said chamber, and a means for withdrawing a portion of the suspension from said chamber without destruction of the circulation of the suspension within said chamber.

23. Apparatus for bringing about chemical reactions between gases and finely divided solid material, which comprises a chamber, means for introducing a gas and finely divided solid material into said chamber, fan blades within said chamber confined to the lower part of said chamber adapted to rotate at such a speed to form a circulating suspension of solid material in the gas within said chamber, and means for closing said chamber against exit of gas or solid material therefrom during the rotation of said fan blades.

24. The process of bringing about chemical changes in which a gaseous medium and finely divided solid material are involved which comprises introducing the gaseous medium and the finely divided solid material into a reaction zone, and applying mechanical propelling power within said zone to said gaseous medium and finely divided solid material within said zone to form a suspension of the said solid material in the gaseous medium and to circulate the suspension in said zone.

25. The process of bringing about chemical changes in which a gaseous medium and finely divided solid material are involved which comprises introducing the gaseous medium and the finely divided solid material into a reaction zone, applying mechanical propelling power within said zone to said gaseous medium and finely divided solid material within said zone to form a suspension of the said solid material in the gaseous medium and to circulate the suspension in said zone, and subjecting the circulating suspension to the action of heat.

NIELS C. CHRISTENSEN.